Figure 1:
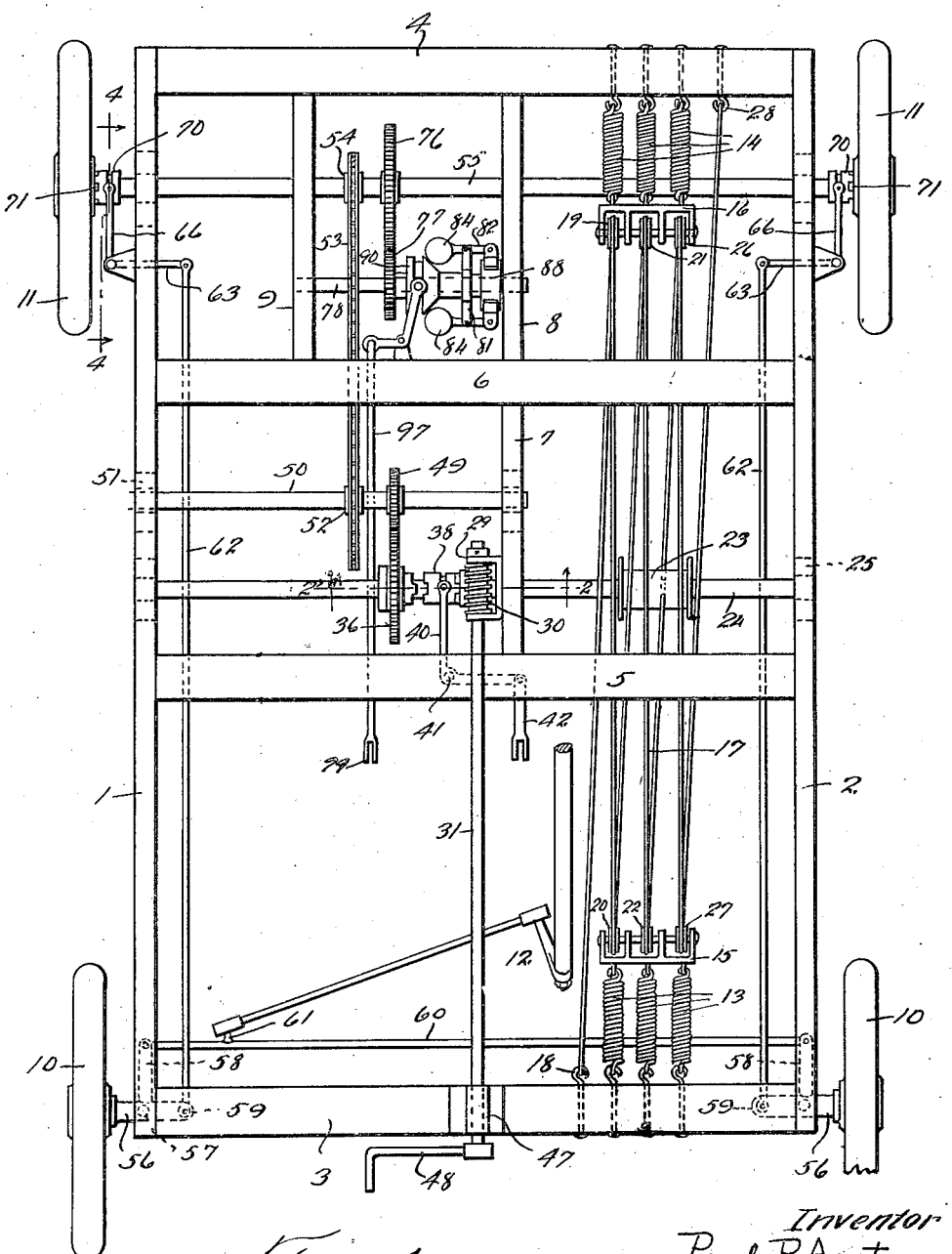

Dec. 26, 1922.　　　　　　　　　　　　　　　　1,440,126
P. P. AUST.
SPRING PROPELLED VEHICLE.
FILED JUNE 21, 1922.
2 SHEETS-SHEET 2
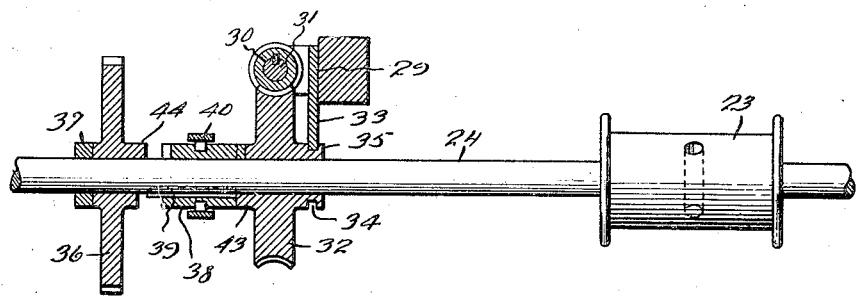
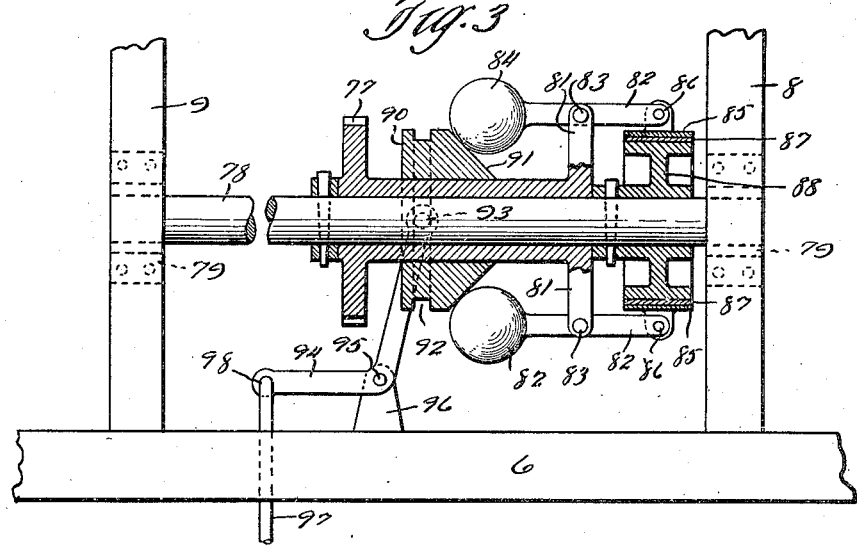
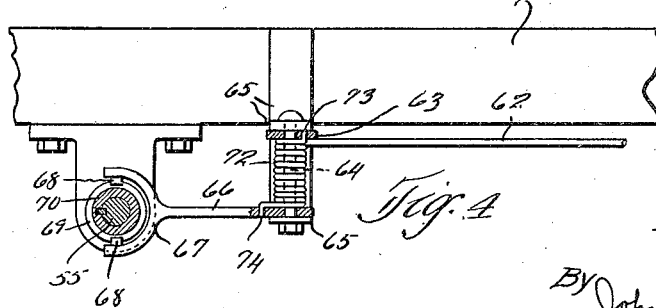
Inventor
Paul P. Aust
By John A. Bommhardt
Atty.

Patented Dec. 26, 1922.

1,440,126

UNITED STATES PATENT OFFICE.

PAUL P. AUST, OF CLEVELAND, OHIO, ASSIGNOR OF ONE-HALF TO FRANK S. HENN, OF CLEVELAND, OHIO.

SPRING-PROPELLED VEHICLE.

Application filed June 21, 1922. Serial No. 570,025.

*To all whom it may concern:*

Be it known that I, PAUL P. AUST, a citizen of the United States, residing at Cleveland, in the county of Cuyahoga and State of Ohio, have invented certain new and useful Improvements in Spring-Propelled Vehicles, of which the following is a specification.

This invention relates to spring propelled vehicles of the small type such as toy automobiles capable of carrying one or two children. The principal object is to provide a device of this character which is simple of construction and cheap to manufacture. Another object is to provide a novel braking means and governor for the same. A still further object is to provide means for disengaging one or the other of the rear wheels from the rotating axle when the car is running in a circle or other curve.

In the drawings Fig. 1 is a plan view of the chassis; Fig. 2 is an enlarged section on line 2—2 of Fig. 1; Fig. 3 is an enlarged horizontal section through the governor and brake mechanism; Fig. 4 is a section on the line 4—4 of Fig. 1.

Referring to the drawings by reference numerals 1 and 2 indicate the side frames of the chassis; 3 and 4 the end members thereof; 5 and 6 the cross members extending between the sides 1 and 2 and between the ends 3 and 4; 7 and 8 and 9 indicate cross members extending between the cross members 5, 6 and 4. 10 indicates the front wheels and 11 the rear wheels thereof. 12 generally indicates the steering mechanism.

Fastened to the front and rear cross members 3 and 4 are one end of a set of coiled springs 13 and 14 having their other ends attached to sheave blocks 15 and 16. One end of a cable 17 is attached to the front cross member 3 as indicated at 18 and extends backward and over the pulley 19 in the sheave block 16 and thence forward and over the pulley 20 in the sheave block 15; thence backward over a pulley 21 and forwardly again over a pulley 22 and thence rearwardly, through a drum 23 mounted on a shaft 24 carried in brackets 25, and over a pulley 26 and thence forwardly again and over a pulley 27 and then rearwardly and is attached to the rear cross member 4 as indicated at 28. A bracket 29 is attached to the cross piece 7 and carries a worm 30 on a shaft 31 which meshes with a worm wheel 32 loosely mounted on the shaft 24, the worm wheel 32 is held beneath the worm 30 by a depending arm 33 projecting downwardly from the bracket 29 and engaging a groove 34 in the hub 35 of the worm wheel 32. To the left of the worm wheel 32 is a gear 36 also loosely mounted upon the shaft 24 and held in its proper place by a collar 37. Between the worm wheel 32 and the gear 36 is a clutch member 38 which is slidably keyed as indicated at 39 to the shaft 24 and which is adapted to be shifted in either direction by a bell crank 40 pivoted at 41 and operated by an arm 42 which in turn is connected to a pedal carried by the body of the automobile, not shown. This clutch member 38 is adapted to engage either the clutch face 43 on the worm wheel 32 or the clutch face 44 on the gear 36.

The shaft 31 extends forwardly and through a bearing 47 carried on the front cross piece 3 and has a crank 48 thereon. The clutch member 38 may be thrown into engagement with the clutch face 43 of the worm wheel 32 and then by turning the crank 48 the worm 30 is turned, consequently the worm 32 and the shaft 24, through the clutch 38, and consequently the drum 23 which will wind the cable 17 thereon, gradually pulling the sheave blocks 15 and 16 toward each other and placing the springs 13 and 14 under tension.

The gear 36 meshes with a gear 49 on a shaft 50 carried in bearings 51 on the side member 1 and cross piece 7. A sprocket wheel 52 is also rigidly connected to the shaft 50 and has a sprocket chain 53 connecting the sprocket 52 and a sprocket 54 on the rear axle 55. To run the device the clutch member 38 is shifted into engagement with the clutch face 44 of the gear 36 which when the shaft 24 is rotated by the action of the springs 13 and 14 will cause the gear 36 to be rotated and consequently the gear 49, sheave 50, sprocket 52, chain 53, sprocket 54 and axle 55.

The front wheels 10 are carried by spindles 56 pivoted to the frame at 57, said spindles having rearwardly projecting arms 58 and inwardly projecting arms 59. A cross rod 60 connects the arms 58 and the steering mechanism is connected to this rod 60 as indicated at 61.

Rods 62 are pivotally connected at one end to the inwardly projecting arms 59 and have their other end connected to arms 63 which are loosely mounted on shafts 64 carried by brackets 65 on the sides of the frame. Arms 66 are loosely mounted on the lower ends of the shafts 64 and extend rearwardly and each has its rear end yoked as at 67 and has pins 68 thereon which engage in a groove 69 of a clutch member 70 slidably keyed on the axle 55 adjacent the rear wheels 11 and are adapted to be moved into or out of engagement with clutch faces 71 on the wheels 11. Coil springs 72 are placed between the arms 63 and 66, one end of the springs being turned upwardly and inserted in holes in the arms 63 as indicated at 73 and the lower end being turned downwardly and inserted in holes in the arms 66 as indicated at 74. It will be seen by this construction that when the front wheels 10 are turned in one direction it will disengage one clutch 70 from its wheel 11 whereas the other will be forced in more firmly by the action of the spring 72 so that when the machine is running on a curve the inside rear wheel will be released from the shaft 55. This makes a simple and cheap construction to be used in place of a differential gear.

A gear 76 is keyed to the shaft 55 between the cross members 8 and 9 and meshes with a gear 77 loosely mounted on the shaft 78 carried by brackets 79 on the cross members 8 and 9. A hub 80 extends outwardly from the gear 77 around the shaft 78 and has two bifurcated arms 81 extending out from the forward end thereof. Arms 82 are pivoted to the arms 81 and 83 and these arms 82 have a heavy ball 84 on one end thereof and a brake shoe 85 pivotally connected at 86 to the other end thereof. These brake shoes 85 are lined with a brake lining as indicated at 87 and the balls 84 when thrown outwardly due to the rotation of the hub 80 will exert a pressure on a drum 88 which is pinned to the shaft 78. The shaft 78 is securely fastened within the bearings 79 and does not rotate. Slidably mounted on the hub 80 is a member 90 which has a cone face 91 on the front thereof and has a groove 92 therein into which pins 93 carried by cranks 94 are inserted. The bell crank 94 is pivoted at 95 to a bracket 96 and has one end of a rod 97 connected thereto as at 98 and the other end of the rod is bifurcated as at 99 and is connected to a brake pedal not shown carried by the body of the car. When it is desired to slow up the machine or stop it the cone 91 is forced into engagement with the balls 84 by the brake rod 97 and the bell crank 94. This will tend to force balls 84 apart and will consequently force the brake shoes 85 against the drum 88 and slow down the machine.

It will be seen that this device makes a very simple and effective governor for the car and also a brake therefor.

In use the springs 13 and 14 are placed under tension by the hand crank, and the power so stored in the springs may then be utilized to drive the car, the contraction of the springs acting to rotate the drum 23 and the parts geared thereto. Or when running down hill the clutch 38 may be thrown in mesh with the gear 32 to wind the springs, for the same purpose. As above described, the turning of the front wheels as in steering will release one or the other of the rear wheel clutches, so that the effect of a differential is produced.

I claim:

1. In a driving mechanism for vehicles, the combination of a power shaft, a transmission between the shaft and the driving axle of the vehicle, a set of coiled springs carried by the body of the vehicle, a drum on the power shaft, a cable and pulley connection between the drum and the respective springs of the set, a winding gear, and a clutch on the power shaft engageable with either the winding gear or the transmission.

2. In a driving mechanism for vehicles, the combination of a power shaft, a transmission between the shaft and the driving axle of the vehicle, a set of coiled springs carried by the body of the vehicle, a drum on the power shaft, a cable and pulley connection between the drum and the respective springs of the set, a winding gear, and a clutch on the power shaft engageable with either the winding gear or the transmission, a jack shaft geared to the driving axle, and a speed actuated brake carried by the jack shaft.

3. In a driving mechanism for vehicles, the combination of a power shaft, a transmission between the shaft and the driving axle of the vehicle, a set of coiled springs carried by the body of the vehicle, a drum on the power shaft, a cable and pulley connection between the drum and the respective springs of the set, a winding gear, and a clutch on the power shaft engageable with either the winding gear or the transmission, a jack shaft geared to the driving axle, and a speed actuated brake carried by the jack shaft, said brake being also provided with means to operate the same manually.

4. A driving mechanism for vehicles comprising a power shaft extending across the middle of the chassis, a drum on said power shaft, transmission mechanism between the power shaft and the driving axle of the vehicle, coiled springs at the front and rear ends of the chassis, pulley blocks connected to said springs, and a cable connected at its ends to the opposite ends of the chassis and extending back and forth between said pulley blocks, and connected at about the middle thereof to the pulley, and means to manually rotate the power shaft to wind the cable on the drum, and a clutch on the power shaft engageable either with said means or with said transmission mechanism.

In testimony whereof, I affix my signature in presence of two witnesses.

PAUL P. AUST.

Witnesses:
HENN,
JOHN A. BOMMHARDT.